US005966689A

United States Patent [19]

McCree

[11] Patent Number: 5,966,689

[45] Date of Patent: Oct. 12, 1999

[54] ADAPTIVE FILTER AND FILTERING METHOD FOR LOW BIT RATE CODING

[75] Inventor: Alan V. McCree, Dallas, Tex.

[73] Assignee: Texas Instruments Incorporated, Dallas, Tex.

[21] Appl. No.: 08/877,833

[22] Filed: Jun. 18, 1997

Related U.S. Application Data

[60] Provisional application No. 60/020,337, Jun. 19, 1996.

[51] Int. Cl.[6] ................................ G10L 3/02; H04B 1/66

[52] U.S. Cl. .......................... 704/226; 704/219; 704/227

[58] Field of Search .................................... 704/226, 227, 704/228, 240, 219

[56] References Cited

U.S. PATENT DOCUMENTS 4,969,192 11/1990 Chen et al. ............................ 704/222

FOREIGN PATENT DOCUMENTS

0276394 A2 11/1987 European Pat. Off. .
0632666 A1 5/1994 European Pat. Off. .

*Primary Examiner*—David R. Hudspeth
*Assistant Examiner*—Martin Lerner
*Attorney, Agent, or Firm*—Robert L. Troike; Richard L. Donaldson

[57] ABSTRACT

An improved filtering method for use in an enhancement filter in a mixed excitation linear prediction (MELP) speech coder or a postfilter in a codebook excitation linear prediction (CELP) speech coder is disclosed which includes two filters. The first filter (62) has a transfer function of $$\frac{1-P\left(\frac{z}{\beta\ *\ \text{sig-prob}}\right)}{1-P\left(\frac{z}{\alpha\ *\ \text{sig-prob}}\right)}$$

where P is the set of prediction coefficients, α and β are scaling factors, z is the inverse of the unit delay operation used in the transform representation of the transfer functions and sig-prob is signal probability estimator value and the second filter (65) has a transfer function of $1-\mu z^{-1}*$ sig-prob, where $\mu$= a scaling factor. The sig-prob is the signal probability value based on a comparison of power of the signals in a current frames to a long term estimate of noise power in signal probability estimator (63). The sig-prob value is 1 if the power of the signals is greater than the noise power plus 30 dB and the sig-prob is zero if the power is less than noise power plus 12 dB. Between these two conditions, sig-prob is (log gain−12 dB−noise gain)/18.

33 Claims, 3 Drawing Sheets

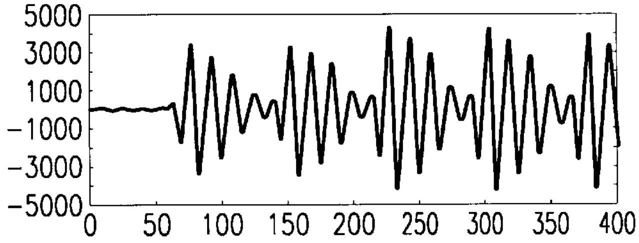
FIG. 4a
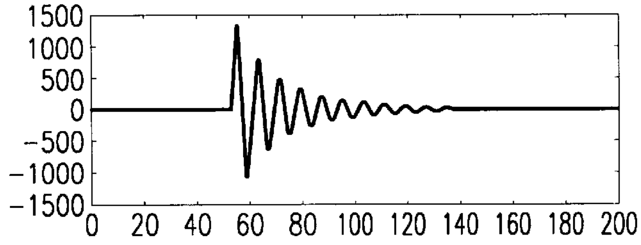
FIG. 4b
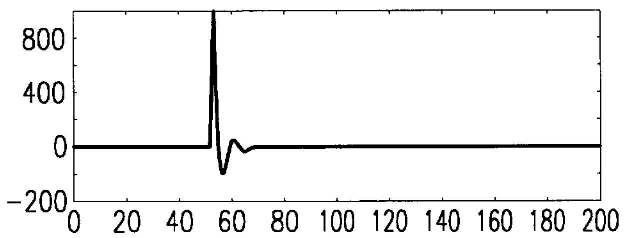
FIG. 4c
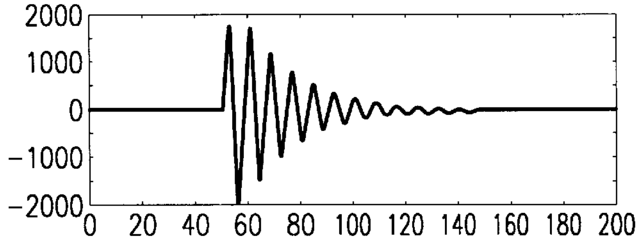
FIG. 4d
FIG. 5
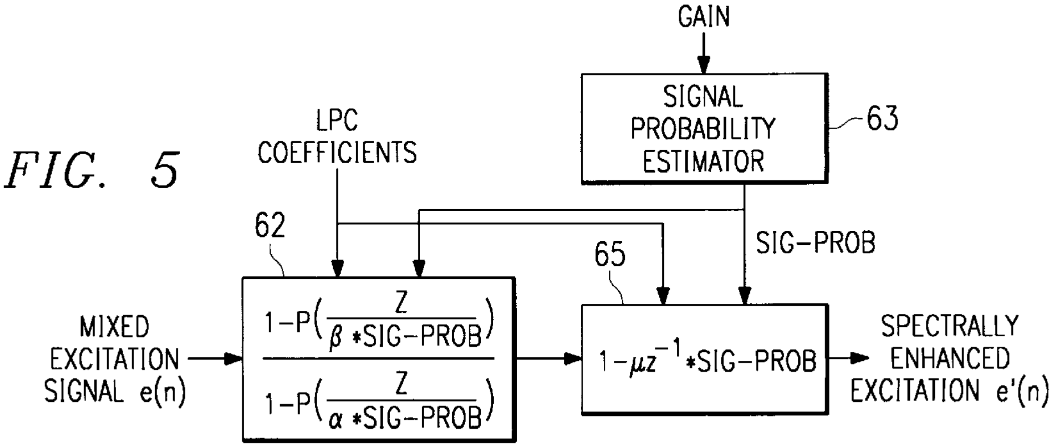

ADAPTIVE FILTER AND FILTERING METHOD FOR LOW BIT RATE CODING

This application claims priority under 35 USC §119(e) (1) of provisional application Ser. No. 60/020,337, filed Jun. 19, 1996.

This invention was made with Government support under contract awarded by the Department of Defense. The Government has certain rights in this invention.

TECHNICAL FIELD OF THE INVENTION

This invention relates to speech coding and more particularly to adaptive filtering in low bit rate speech coding.

RELATED APPLICATION

Application Ser. No. 08/218,003 entitled "Mixed Excitation Linear Prediction with Fractional Pitch" of A. McCree filed Mar. 3, 1994 and application Ser. No. 08/336,593 entitled "Mixed Excitation Linear Prediction with Fractional Pitch" filed Nov. 9, 1994 of A. McCree are related to the subject application and are incorporated herein by reference.

BACKGROUND OF THE INVENTION

Human speech consists of a stream of acoustic signals with frequencies ranging up to roughly 20 KHz; however, the band of about 100 Hz to 5 KHz contains the bulk of the acoustic energy. Telephone transmission of human speech originally consisted of conversion of the analog acoustic signal stream into an analog voltage signal stream (e.g., by using a microphone) for transmission and reconversion back to an acoustic signal stream (e.g., by using a loudspeaker). The electrical signals would be bandpass filtered to retain only the 300 Hz to 4 KHz frequency band to limit bandwidth and avoid low frequency problems. However, the advantages of digital electrical signal transmission has inspired a conversion to digital telephone transmission beginning in the 1960s. Digital telephone signals are typically derived from sampling analog signals at 8 KHz and nonlinearly quantizing the samples with 8 bit codes according to the $\mu$-law (pulse code modulation, or PCM). A clocked digital-to-analog converter and companding amplifier reconstruct an analog electrical signal stream from the stream of 8-bit samples. Such signals require transmission rates of 64 Kbps (kilobits per second) and this exceeds the former analog signal transmission bandwidth.

The storage of speech information in analog format (for example, on magnetic tape in a telephone answering machine) can likewise be replaced with digital storage. However, the memory demands can become overwhelming: 10 minutes of 8-bit PCM sampled at 8 KHz would require about 5 MB (megabytes) of storage.

The demand for lower transmission rates and storage requirements has led to development of compression for speech signals. One approach to speech compression models the physiological generation of speech and thereby reduces the necessary information to be transmitted or stored. In particular, the linear speech production model presumes excitation of a variable filter (which roughly represents the vocal tract) by either a pulse train with pitch period P (for voiced sounds) or white noise (for unvoiced sounds) followed by amplification to adjust the loudness. 1/A(z) traditionally denotes the z transform of the filter's transfer function. The model produces a stream of sounds simply by periodically making a voiced/unvoiced decision plus adjusting the filter coefficients and the gain. Generally, see Markel and Gray, Linear Prediction of Speech (Springer-Verlag 1976).

To reduce the bit rate, the coefficients for successive frames may be interpolated. However, to improve the sound quality, further information may be extracted from the speech, compressed and transmitted or stored. For example, the codebook excitation linear prediction (CELP) method first analyzes a speech frame to find A(z) and filter the speech. Next, a pitch period determination is made and a comb filter removes this periodicity to yield a noise-looking excitation signal. Then the excitation signals are encoded in a codebook. Thus CELP transmits the LPC filter coefficients, the pitch, and the codebook index of the excitation.

Another approach is to mix voiced and unvoiced excitations for the LPC filter. For example, McCree, A New LPC Vocoder Model for Low Bit Rate Speech Coding, Ph.D. thesis, Georgia Institute of Technology, August 1992, divide the excitation frequency range into bands, make the voiced/unvoiced mixture decision in each band separately, and combine the results for the total excitation. A mixed excitation linear prediction (MELP) coefficient vocoder is described in an article by A. McCree, et al. entitled "A Mixed Excitation LPC Vocoder Model for Low Bit Rate Speech Coding", in IEEE Trans. on Speech and Audio Proc., Vol. 3, No. 4, July 1995. The above cited application Ser. No. 08/218,003 and 08/336,593 describe a mixed excitation linear prediction speech coder. These references are incorporated herein by reference.

Most low bit rate speech coders employ some form of adaptive spectral enhancement filter or postfilter to improve the perceived quality of the processed speech signal. For example, in the Mixed Excitation Linear Predictive (MELP) speech coder in McCree, et al. an adaptive pole/zero enhancement filter based on the LPC spectrum is used. The adaptive spectral enhancement filter helps the bandpass filtered speech to match natural speech waveforms in the format region. This adaptive filter described above improves the speech quality for clean input signals, but in the presence of acoustic noise this filter may actually degrade performance. The enhancement filter tends to increase the fluctuations in the power spectrum of the acoustic background noise, causing an unnatural "swirling" effect that can be very annoying to listeners. A similar effect takes place in the postfilter of the CELP speech coder.

In accordance with one object of the present invention an improvement is provided to this adaptive spectral enhancement filter or postfilter in CELP which results in better performance in the presence of acoustic noise while maintaining the quality improvement of the existing method for clean speech signals.

SUMMARY OF THE INVENTION

In accordance with one embodiment of the present invention, a filtering method for improving digitally processed speech in low bit rate speech or audio signals is provided wherein the filtering is controlled by linear predictive coefficient parameters and the estimated probability that the input frame is speech rather than background noise. In this way, the benefits of filtering are realized for clean speech signals without introducing artifacts to the processed background noise.

These and other features of the invention that will be apparent to those skilled in the art from the following detailed description of the invention, taken together with the accompanying drawings.

DESCRIPTION OF THE DRAWINGS

In the drawing:

FIGS. 4*a–d* illustrates natural speech vs. decaying waveforms where 4*a* illustrates a first formant of natural speech vowel; 4*b* synthetic exponentially decaying resonance; 4*c* poletzero enhancement filter impulse response for this resonance; and 4*d* enhance decaying resonance;

FIG. 5 is a block diagram of the adaptive spectral enhancement according to one embodiment of the present invention.

DETAILED DESCRIPTION OF PREFERRED EMBODIMENT

Figure 1:
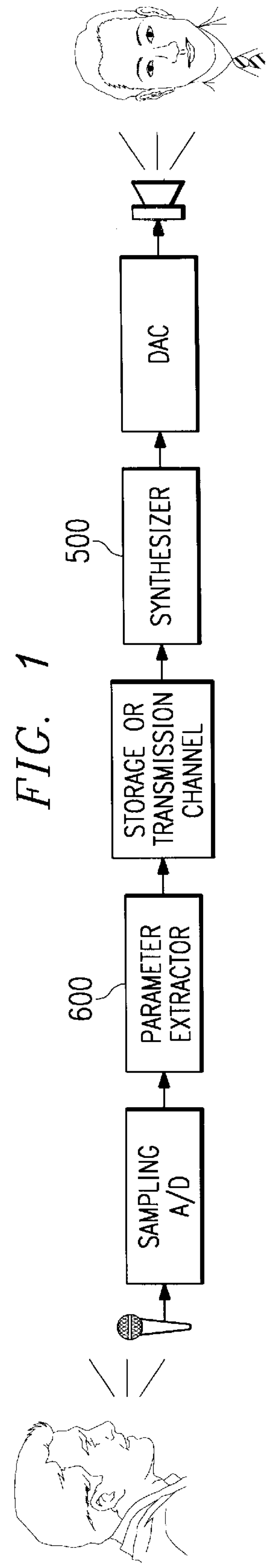
FIG. 1 is a general block diagram of a speech communication system.
Figure 2:
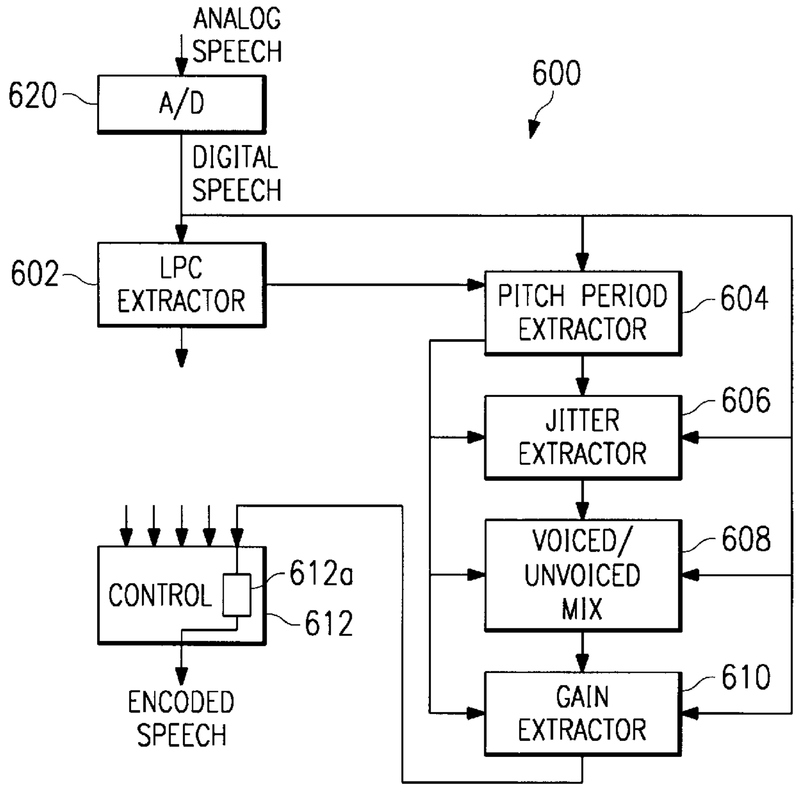
FIG. 2 is a block diagram of the speech analyzer of FIG. 1.

The overall low bit rate speech communication system is illustrated in FIG. 1 where the input speech is sampled by an analog to digital converter and the parameters are encoded and sent to analyzer 600 and are sent via the storage and transmission channel to the synthesizer 500. The decoded signals from the synthesizer 500 are converted back by the digital to analog converter (DAC) to signals for the speaker. Referring to FIG. 2, there is illustrated some blocks of the analyzer. The analog input speech is converted to digital speech at converter 620 and applied to a speech analyzer which includes an LPC extractor 602, a pitch period extractor 604, a jitter extractor 606, a voiced/unvoiced mixture control extractor 608, a gain extractor 610, and an encoder 612for assembling these five block inputs from 602–610 and outputs and clocking them out encoded over a transmission channel. At the synthesizer 500 there is the decoder 536 which decodes the encoded speech from encoder 612 to provide the LPC parameters, pitch period, mix, jitter flags, and gain.

Figure 3:
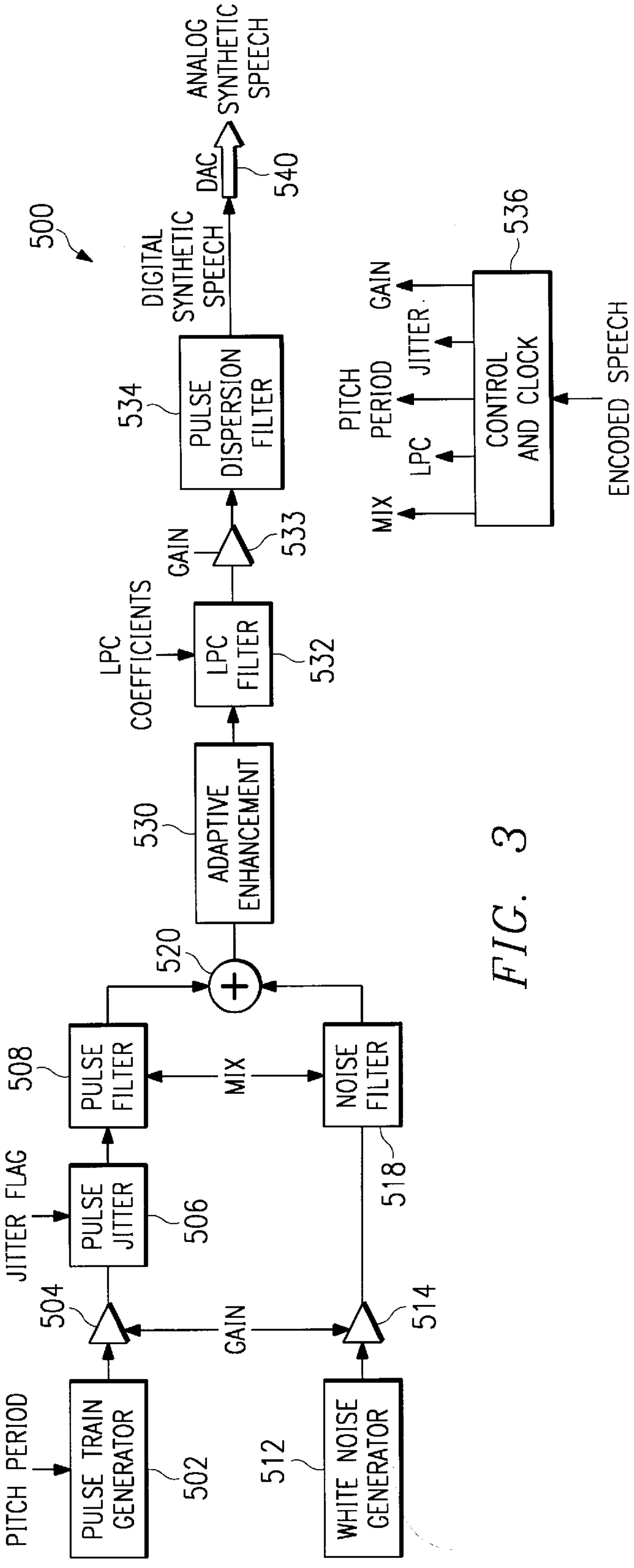
FIG. 3 is a block diagram of a synthesizer.

Referring to FIG. 3 there is illustrated a MELP vocoder according to one embodiment of the present invention and described in U.S. patent application Ser. No. 08/218,003 filed Mar. 25, 1994 and similar to that in the above cited McCree, et al. article. The synthesizer 500 includes a periodic pulse train generator 502 controlled by a pitch period input from decoder 536, a pulse train amplifier 504 controlled by a gain input from decoder 536, a pulse jitter generator 506 controlled by a flag input from jitter output of decoder 536, a pulse filter 508 controlled by five band voiced/unvoiced mixture inputs from decoder 536. The synthesizer 500 further includes a white noise generator 512, a gain amplifier also controlled by the same gain input, noise filter 518 also controlled by the same five band voiced/unvoiced mixture inputs, and an adder 520 to combine the filtered pulse and noise. The adder output is the mixed excitation signal e(n) which is applied to an adaptive spectral enhancement filter 530 which adds emphasis to the formants to produce e'(n). This output is applied to an LPC synthesis filter 532 controlled by 10 LPC coefficients. The output of this is amplified in amplifier 533 with gain from decoder 536 and applied to a pulse dispersion filter 534 to get digital synthetic speech. This digitized speech is then converted to analog speech for a loud speaker using a digital to analog converter 540. In accordance with another embodiment of the present invention, the adder output e(n) is applied to the synthesis filter 532 controlled by 10 LPC coefficients and the output of the LPC filter is applied to the adaptive enhancement filter 530 to add emphasis to the formants to produce e'(n).

In accordance with one embodiment of the present invention, the present invention enhances the adaptive spectral enhancement filter 530. The adaptive spectral enhancement filter 530 in the MELP coder is a pole/zero filter based on the LPC filter coefficients. This adaptive filter helps the bandpass filtered synthetic speech to match natural speech waveforms in the formant regions. Typical formant resonances usually do not completely decay in the time between pitch pulses in either natural or synthetic speech, but the synthetic speech waveforms reach a lower valley between the peaks than natural speech waveforms do. This is probably caused by the inability of the poles in the LPC synthesis filter to reproduce the features of formant resonances in natural human speech. There are two possible reasons for this problem. One cause could be improper LPC pole bandwidth; the synthetic time signal may decay too quickly because the LPC pole has a weaker resonance than the true formant. Another possible explanation is that the true formant bandwidth may vary somewhat within the pitch period, and the synthetic speech cannot mimic this behavior.

The adaptive spectral enhancement filter in the above cited McCree article of July 1995 provides a simple solution to the problem of matching formant waveforms. An adaptive pole/zero filter is widely used in CELP coders since it is intended to reduce quantization noise in between the formant frequencies. See article of Chen, et al. entitled "Real-Time Vector APC Speech Coding at 4800 bps with Adaptive Post Filtering", in Proc. IEEE Int. Conf.. Accost, Speech Signal Processing, Dallas 1987, pp. 2185–2188. Also see Campbell, et al. entitled "The DOD 4.8 kps Standard (proposed Federal Standard 1016)," in *Advances in Speech Coding*, Norwell, M A: Kluwer, 1991, pp. 121–133. These references are incorporated herein by reference. The poles are generated by a bandwidth expanded version of the LPC synthesis filter, with $\alpha$ equal to 0.8. According to the McCree article, since this all-pole filter introduces a disturbing lowpass filtering effect by increasing the spectral tilt, a weaker all-zero filter calculated with a equal to 0.5 is used to decrease the tilt of the overall filter without reducing the formant enhancement. In addition, a simple first-order FIR filter is used to further reduce the low pass muffling effect. In the mixed excitation LPC vocoder, reducing quantization noise is not a concern, but the time-domain properties of this filter produce an effect similar to pitch-synchronous pole bandwidth modulation. As shown in FIG. 4, a simple decaying resonance has a less abrupt time-domain attack when this enhancement filter is applied. FIG. 4 illustrates natural speech versus decaying resonance waveforms where the X axis is time and Y axis is amplitude. FIG. 4*a* illustrates the first formant of natural speech vowel. FIG. 4*b* illustrates synthetic exponentially decaying resonance. FIG. 4(*c*) illustrates pole/zero enhancement filter impulse response for this resonance. FIG. 4*d* illustrates the enhanced decaying resonance. This feature allows the LPC vocoder speech output to better match the bandpass waveform properties of natural speech in formant regions, and it increases the perceived quality of the synthetic speech.

As discussed above, the poles of the enhancement filter are the poles of the LPC filter shifted in towards the unit circle in the z-plane by a factor of 0.8.

In accordance with the present invention, since this all-pole filter by itself introduces a muffled characteristic to the processed speech signal, a weaker all-zero filter is used in cascade to compensate for the spectral tilt introduced by the poles. In addition, another zero is included in the filter to further reduce spectral tilt., Chen, et al. in U.S. Pat. No. 4,969,192, entitled, "Vector Adaptive Predictive Coder for Speech and Audio," used a second filter in a postfilter in a CELP speech coder.

The problem with this existing method is that it increases fluctuations present in acoustic background noise. Our new method, taught herein, adapts the strength of the spectral enhancement filter based on an estimate of the probability that the current input frame is speech rather than background noise. This probability is estimated by comparing the power in the current speech frame to a long-term estimate of the noise power. To prevent possible discontinuities from switching the enhancement filter on and off, the strength of the filter gradually varies from no filtering at all to full spectral enhancement over a range of signal probabilities.

Referring to FIG. 5 there is illustrated a block diagram of the improved enhancement filter according to the present invention. The mixed excitation signal e(n) is applied to filter 62 which is controlled by the LPC coefficients P and which has the transfer function of $$H(z)=\frac{1-P(z/\beta)}{1-P(z/\alpha)}\quad 0<\beta<\alpha<1$$

where z is the inverse of unit delay operator $z^{-1}$, α and β are coefficients empirically determined with some tradeoff between spectral peaks producing chirping and not achieving spectral enhancement. The prediction filter coefficients 1−P(z) are equal to the analysis filter coefficients A(z). The frequency response in Hz is the difference between the frequency responses of two all pole filter as:

$$20\log\left|H(e^{jw})\right| = 20\log\frac{1}{\left|1-P\left(e^{\frac{ju}{\alpha}}\right)\right|} - 20\log\frac{1}{\left|1-P\left(e^{\frac{jw}{\beta}}\right)\right|}$$

Figure 6:
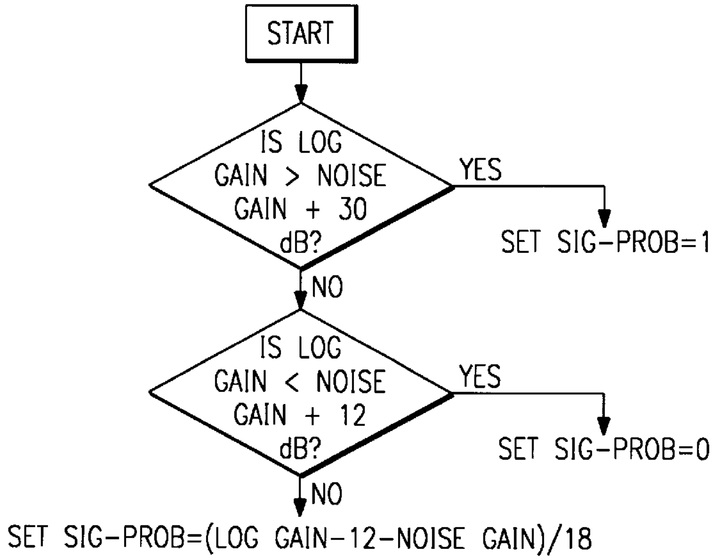
FIG. 6 is a flow chart of the signal probability estimator.

In the prior McCree article, the values for the enhancement filter comprised of a first filter, where β=0.5 and α=0.8 and a second filter of a transfer function of $1-\mu z^{-1}$. According to the present invention for the first filter, the signal probability (sig-prob) value from the signal probability estimator 63 is multiplied (*)to the β of 0.5 and multiplied (*) to the α of 0.8, or β=0.5* sig-prob (signal probability as measured at estimator) and α=0.8* sig-prob at the filter 62. The output of filter 62 is coupled to a second filter 65 which has the transfer function of $1-\mu z^{-1}$ multiplied (*) by sig-prob where μ is typically 0.5 multiplied by (*) k(1). The term k(1) is the first reflection coefficient. The signal probability estimator 63 is responsive to the gain from the analyzer (610 in FIG. 2 decoded from 536 of FIG. 3) to determine if the power in the current frame compares to a long term estimate of the noise power. A flow chart of the estimator is shown in FIG. 6. The estimator 63 sets some time constants and step sizes and then compares the log of the gain to noise gain +30 dB. If the power level is greater than noise gain +30 dB, set sig-prob to 1 and if less than noise gain +12 dB, set the sig-prob to zero to have no filtering. In this way, the filter is applied if a signal is present but not if noise is present. If the gain is between these extremes the sig-prob value is equal to (log-gain−12 dB−noise gain) divided by 18. This is a linear ramp value of between 0 and 1 between 12 dB and 30 dB. This "sig-prob" becomes the multiplier for α, β and μ. The time constants are selected to average out the voice signal and approximate the value of the noise floor.

In a real-time implementation of a 2.4 kb/s MELP coder running on a TMS320C31 DSP chip, this improved adaptive spectral enhancement method results in a clear improvement in speech quality for noisy input speech, while maintaining the same quality as the existing method for clean input signals.

The estimator 63 may be part of the processor chip running code following the pseudo code below:

```
* Estimate average noise gain from log gain for current frame
time constants/step size
    up = 0.0675;
    down = -0.27;
    min = 10;
    max = 80;
    if (log_gain > noise_gain + up)
        noise_gain = noise_gain + up;
    else if (log_gain < noise_gain + down)
        noise_gain = noise_gain + down;
    else
        noise_gain = log_gain;
    /* Constrain total range of noise_gain */
    if (noise_gain < min)
        noise_gain = min;
    if (noise_gain > max)
        noise_gain = max;
* Estimate current frame signal probability by comparing to noise
power
    if (log_gain > noise_gain + 30dB
        sig_prob = 1.0;
    else if (log_gain < noise_gain + 12 dB)
        sig_prob = 0.0;
    else
        sig_prob = (log_gain - 12 - noise_gain) /18;
* Calculate postfilter coefficients
    pf_num = bw_expand (1pc_coeff, sig_*0.5) ;
    pf_den = bw_expand (1pc_coeff, sig_prob*0.8) ;
    tilt_cof = [1, -sig_prob*k [1 first reflection coefficient]];
* Apply adaptive spectral enhancement filter to excitation signal
    filter (excitation, pf_num, pf_den) ;
    filter (excitation, tilt_cof) ;
```

We note that this method can easily be applied in other speech coding applications where spectral enhancement or postfiltering is desired.

Chen, et al., U.S. Pat. No. 4,969,192 cited above described a post filter where the values for the first filter are β=0.5 and α=0.8 and the second filter transfer function is $1-\mu z^{-1}$. In accordance with the teachings herein the short delay post filter 32*a* when modified as discussed above to account for the estimated probability is speech rather than background noise such that for the first filter β=0.5* sig-prob and α=0.8* sig-prob. The second filter would have the transfer function $\mu z^{-1}$* sig-prob, where μ is 0.5* k(1) where k(1) is the first reflection coefficient.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A filtering method for improving digitally processed speech signals;

generating a signal probability estimator value based on a comparison of signal power of said signals in a current frame to a long term estimate of noise power;

first filtering said signals wherein the filtering is controlled by linear predictive coefficients and said signal probability value; and second filtering by the transfer function of the form $1-\mu z^{-1}$* signal probability value where μ is a scaling factor and $z^{-1}$ is a unit delay operator.

2. The filtering method of claim 1 wherein said signal probability value is 1 if log gain of said signal power of said signals is greater than noise power plus 30 cB.

3. The filtering method of claim 2 wherein said signal probability value is zero if said signal power is less than noise power plus 12 dB.

4. The filtering method of claim 3 wherein of said signal power is greater than noise gain plus 12 dB and less than noise gain plus 30 dB the signal probability value equals (log gain−12−noise gain)/18.

5. The filtering method of claim 4 wherein said first filtering step has a transfer function of:

$$\frac{1-P\left(\frac{z}{\beta\cdot\text{sig-prob}}\right)}{1-P\left(\frac{z}{\alpha\cdot\text{sig-prob}}\right)}$$

where P is the set of prediction coefficients, α and β are scaling factors and z is the inverse of the unit delay $z^{-1}$.

6. The filtering method of claim 5 wherein α=0.8, β=0.5.

7. The filtering method of claim 6 wherein μ is 0.5* k(1), where k(1) is the first reflection coefficient.

8. The filtering method of claim 1 wherein said first filtering step has a transfer function of:

$$\frac{1-P\left(\frac{z}{\beta\cdot\text{sig-prob}}\right)}{1-P\left(\frac{z}{\alpha\cdot\text{sig-prob}}\right)}$$

where P is the set of prediction coefficients, α and β are scaling factors and z is the inverse of the unit delay $z^{-1}$.

9. The filtering method of claim 8, wherein α=0.8 and β=0.5 and μ=0.5($k_1$) where k(1) is the first reflection coefficient.

10. A filtering method for enhancing digitally processed speech or audio signals comprising the steps of:

buffering said speech or audio signals into frames of vectors, each vector having K successive samples;

performing analysis of said buffered frames of speech or audio signals in predetermined blocks to compute linear predictive coefficients and signal power in the current frame;

generating a signal probability estimator value sig-prob based on comparison of the signal power in the current frame to a long term estimate of the noise power;

first filtering each vector by a delay controlled by said linear predictive coefficient and said signal probability estimator value, wherein filtering is accomplished by using a transfer function of the form $$\frac{1-P\left(\frac{z}{\beta*\text{sig-prob}}\right)}{1-P\left(\frac{z}{\alpha*\text{sig-prob}}\right)}\quad 0<\beta<\alpha<1$$

where 1−P is the LPC coefficient, z is the inverse of the unit delay operator used in the transform representation of the transfer functions, α and β are scaling factors * sig-prob; and second filtering by the transfer function of the form $1-\mu z^{-1}$* sig-prob, where μ=scaling factor.

11. The filtering method of claim 10 wherein said signal probability value is 1 if the signal power is greater than noise gain plus 30 dB.

12. The filtering method of claim 11 wherein said signal probability value is zero if the signal power is less than noise gain plus 12 dB.

13. The filtering method of claim 12 wherein if the signal power is grater than noise gain plus 12 dB and less than noise gain plus 30 dB set the signal probability value to equal to (log gain−12−noise gain)/18.

14. The filtering method of claim 10 wherein β is 0.5 and α is 0.8 and μ is 0.5 k(1), where k(1) is the first reflection coefficient.

15. The filtering method of claim 14 wherein said sig-prob is 1 if the log gain is greater than noise gain plus 30 dB.

16. The filtering method of claim 15 wherein said sig-prob is zero if the log gain is less than noise gain plus 12 dB.

17. The filtering method of claim 16 wherein if the signal power is greater than noise gain +12 dB and less than noise gain plus 30 dB set sig-prob to equal (log gain−12−noise gain)/18.

18. A low bit rate speech communication system for transmitting speech signals comprising:

means for buffering said speech signals into frames of vectors, each vector having successive samples;

means for performing analysis of said buffered frames of speech or audio signals in predetermined blocks to compute encoded speech including linear predictive coefficients and power in the current frame;

means for transmitting said encoded speech over a transmission channel, a synthesizer coupled to said means for transmitting and responsive to said encoded speech for decoding said speech into digital signals;

a digital to analog converter means responsive to said digital signals from said synthesizer for providing speech signals, said synthesizer comprising means for enhancing digitally processed speech comprising:

means for generating a signal probability estimator value sig-prob based on comparison of the power in the current frame to a long term estimate of the noise power;

first filter means for filtering each vector by a delay controlled by said linear predictive coefficient and said signal probability estimator value, wherein filtering is accomplished by using a transfer function of the form $$\frac{1-P\left(\frac{z}{\beta*\text{sig-prob}}\right)}{1-P\left(\frac{z}{\alpha*\text{sig-prob}}\right)}\quad 0<\beta<\alpha<1$$

where 1−P is the LPC coefficients, z is the inverse of the unit delay operator used in the transform representation of the transfer functions, α and β are scaling factors; and second filter means for filtering by the transfer function of the form $1-\mu z^{-1}$* sig-prob, where μ=scaling factor.

19. The system of claim 18 wherein said signal probability value sig-prob is 1 if the signal power is greater than noise gain plus 30 dB.

20. The system of claim 19 wherein said signal probability value sig-prob is zero if the signal power is less than noise gain plus 12 dB.

21. The system of claim 20 wherein if the signal power is greater grater than noise gain plus 12 dB and less than noise gain plus 30 dB set the signal probability value sig-prob equal to (log gain−12−noise gain)/18.

22. The system of claim 18 wherein β is 0.5 and α is 0.8 and μ is 0.5 k(1), where k(1) is the first reflection coefficient.

23. The system of claim 18 wherein said synthesizer includes an LPC filter controlled by LPC coefficients.

24. The system of claim 23 wherein said means for enhancing is before said LPC filter.

25. The system of claim 23 wherein said means for enhancing is after said LPC filter.

26. The system of claim 18 wherein said system is a MELP coder.

27. A filter for improving digitally processed speech signals comprising:

means for generating a signal probability estimator value based on a comparison of signal power of said signals in a current frame to a long term estimate of noise power;

a first filter for filtering said signals controlled by linear predictive coefficients and said signal probability value; and a second filter having the transfer function of the form $1-\mu z^{-1}*$ signal probability value where μ is a scaling factor, and $z^{-1}$ is a unit delay factor.

28. The filter of claim 27 wherein said signal probability value is 1 if log gain of said power of said signals is greater than noise signal power plus 30 dB.

29. The filter of claim 28 wherein said signal probability value is zero if said power is less than noise signal power plus 12 dB.

30. The filter of claim 29 wherein of said signal power is greater than noise gain plus 12 dB and less than noise gain plus 30 dB the signal probability value equals (log gain−12−noise gain)/18.

31. The filter of claim 30 wherein said first filter has a transfer function of $$\frac{1-P\left(\frac{z}{\beta * \text{sig-prob}}\right)}{1-P\left(\frac{z}{\alpha * \text{sig-prob}}\right)},$$

where P is the predicted value, α and β are scaling factors, z is the inverse of the unit delay $z^{-1}$, and μ is a scaling factor.

32. The filter of claim 31 wherein α=0.8, β=0.5.

33. The filter of claim 32 wherein μ is 0.5* k(1), where k(1) is the first reflection coefficient.

* * * * *